Sept. 15, 1925.
D. C. ARNOLD ET AL
1,553,972
AIR INLET VALVE
Original Filed Nov. 1, 1922
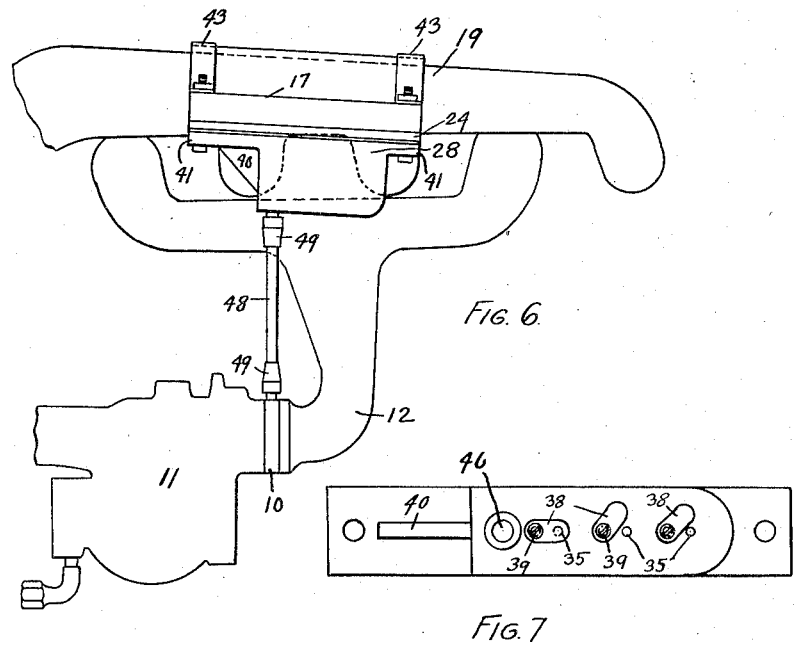
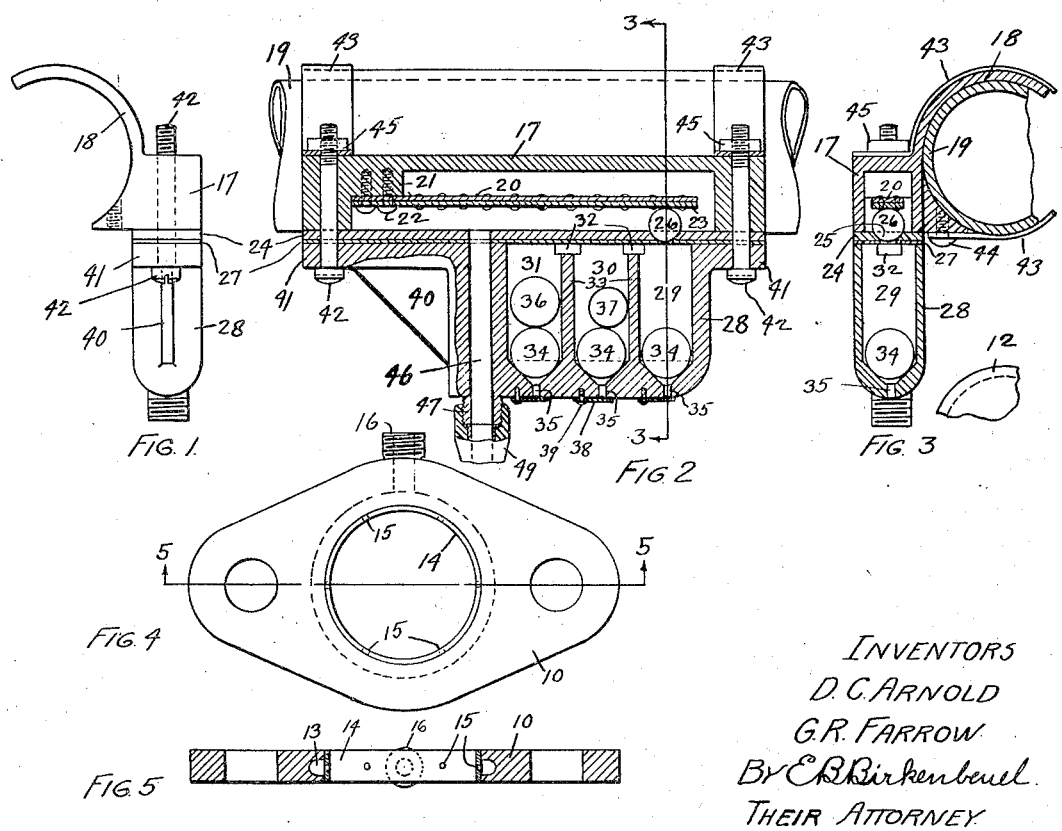
INVENTORS
D. C. ARNOLD
G. R. FARROW
By E. B. Birkenbeuel
THEIR ATTORNEY Patented Sept. 15, 1925.

1,553,972

UNITED STATES PATENT OFFICE.

DANIEL C. ARNOLD AND GEORGE R. FARROW, OF PORTLAND, OREGON.

AIR-INLET VALVE.

Application filed November 1, 1922, Serial No. 598,432. Renewed May 14, 1925.

*To all whom it may concern:*

Be it hereby known that we, DANIEL C. ARNOLD and GEORGE R. FARROW, citizens of the United States, and residents of Portland, in the county of Multnomah and State of Oregon, have invented a new and useful Air-Inlet Valve, of which the following is a specification.

This invention relates more particularly to means for controlling the amount of air admitted to a fuel mixture for internal combustion engines.

The objects of our invention are to provide an exceedingly simple and efficient means for admitting additional air to the combustion chambers of an internal combustion engine when the speed of the engine increases, and to add to the amount of air admitted by steps with further increases of engine speed.

A further object is to so construct our device that it will not admit any additional air when the engine temperature is low but will admit heated air into the intake manifold as the temperature rises and sufficient speed has been attained.

Another object is the complete breaking up of liquid fuel into gaseous fuel.

Still another object is to provide a means for preventing the admission of extra air when the engine is heated and running at high speed, as in hill climbing, etc.

We accomplish these results in the manner set forth in the following specification and illustrated in the accompanying drawing, in which:

Figure 1 is an end elevation of our device. Figure 2 is a longitudinal section through same. Figure 3 is a transverse section along the line 3—3 in Fig. 2. Figure 4 is a plan of the special gasket which we employ for the admission of air into the intake manifold at its point of union with the carbureter. Figure 5 is a section through Fig. 4 along the line 5—5. Figure 6 is a front elevation of a carbureter intake and exhaust manifolds showing our device attached thereto. Figure 7 is a bottom view of the device showing the covers over the air ports.

Similar numbers of reference refer to the same or similar parts throughout the several views.

Referring in detail to the drawing, we have constructed our device in two parts, one of which is in the form of a gasket 10 adapted to be placed between the carbureter 11 and the intake manifold 12 of a Ford automobile engine. The gasket 10 is provided with an internal groove 13 which is covered by a bushing 14 pressed into the central opening in the gasket 10. Small holes 15 in the bushing 14 admit air uniformly from the groove 13 into the manifold 12. A threaded boss 16 is formed on the side of the gasket 10 at a point which will permit the connecting pipe to clear the working parts of the carbureter 11.

The second section of our device consists of an inverted metallic box 17 preferably of aluminum having formed on its rear side the curved face 18 having the same general shape as has the exhaust manifold 19 near its middle. The surface 18 is intended to conduct the heat from the manifold 19 to our device. Inside of the box 17 we have placed the thermostat element 20 secured at one end to the boss 21 by means of the screws 22. It will be understood that the element 20 is constructed of a number of layers of metal having unequal properties of expansion which will cause the ends 23 of the element 20 to bend downwardly when cold and to rise when warm. This type of element is common in the various arts.

On the under side of the box 17 we have placed a cover plate 24 having an opening 25 in which is placed a ball 26 which is adapted to close the hole 25 tightly whenever a low temperature forces the element 20 down against the ball 26. A gasket 27 is placed under the plate 24 and beneath the gasket is placed the valve containing frame 28 provided with the three chambers 29, 30 and 31 whose upper ends are covered by the gasket 27 but which are united by the slots 32 cut between the separating walls 33. In the bottom of each of the chambers 29, 30 and 31 is placed a ball 34 which is adapted to close the air ports 35 when they are not unseated by a suction from above. A similar ball 36 is placed above the ball 34 in the chamber 31 and a smaller ball 37 is placed above the ball 34 in the chamber 30, thereby producing three different weights of check valves.

Covers 38 are pivoted on the screws 39 on the under side of the member 28 and are adapted to close the ports 35 as occasion may require. A stiffening rib 40 is provided on one side of the member 28 whose lugs 41 receive the bolts 42 which unite the member 28 to the member 17. Thin metal bands 43 are secured to the under side of the member 17 by means of the screws 44 brought upwardly around the back of the manifold 19 and secured under the nuts 45 which are placed on the upper end of the screws 42.

Passing upwardly through the member 28 is a hole 46 which also passes through the gasket 27 and the plate 24 and terminates at its lower end in a threaded boss 47 which is joined by the tubing 48 and the fittings 49 to the member 16 on the gasket 10.

The operation of our device is as follows: In starting a car having a cold engine it will be seen that the thermostat will prevent the admission of any additional air, but as soon as the manifold begins to warm up and the heat is conducted to the members 17 and 28 that the ball 26 will be unseated by the suction from the intake manifold. As the engine speeds up and the suction becomes sufficiently great the ball 34 in the chamber 29 also rises and uncovers the port 35 which permits additional air to be warmed on its passage through the members 28 and 17 and to enter the manifold 12, and in so doing to completely break up any liquid fuel which has passed through the carbureter 11. As the speed of the engine increases and the suction also increases, the balls in the chamber 30 are raised which admits still more air, and a still greater suction raises the balls in the chamber 31, provided, of course, that the covers 38 have been moved away from the ports 35.

The covers 38 provide a form of adjustment for the intake port, and on certain occasions all of these may be closed—for example, when climbing hills in very hot weather.

It will be understood that a cutoff valve can be placed in the tubing 48 which may or may not be controllable from the dash of the machine. This would be utilized whenever one wished to dispense with the additional air provided by the device without going to the trouble of closing the ports 35.

We are aware that many forms of devices have been constructed in the past purporting to accomplish the objects above outlined: we therefore intend to cover only such forms and modifications of our device as fall fairly within the appended claims.

What we claim as new is:

1. The combination of an air distributing means adapted to act as a gasket between the carbureter and the intake manifold, with a temperature controlled suction-actuated mechanism consisting of a heating chamber attached to the exhaust manifold, a thermostat within said chamber, a ball check in a port in the bottom of said chamber adapted to be closed by said thermostat at subnormal operating temperatures of the engine to which it is attached, three cylindrical cavities under said heating chamber joined at their upper ends by a passageway and registering with said ball check, inlet ports opening from the bottom of said cavities to the air, a plurality of balls of various weights adapted to close said inlet ports by gravity, and means for closing said inlet ports.

2. In a temperature controlled suction actuated air inlet device, the combination of a heating chamber attached to the side of an exhaust manifold with a ball check in the bottom of said chamber, a thermostat within said chamber adapted to seat said check at low temperatures, a pipe connection from said chamber to the intake manifold, a plurality of cavities on the under side of said heating chamber terminating at their lower ends in outlet ports, balls of various weights within said cavities, and means for closing said intake ports independently.

3. An air inlet valve consisting of a hollow gasket through which heated air may be admitted between the carbureter and intake manifolds of an automobile and a temperature controlled speed regulated device for heating and controlling the amount of air passed through said gasket consisting of a hollow heat conducting frame attached to the exhaust manifold, a plurality of check valves on the under side of said frame terminating at their upper ends in a port opening into said heating chamber, said check valves having balls of various weights therein adapted to admit outside air to said hollow frame, a ball check controlling the port above said check valves, and a thermostat adapted to seat said ball check when the temperature of said device is below the normal operating temperature of the engine to which it is applied.

DANIEL C. ARNOLD.
GEORGE R. FARROW.